United States Patent [19]
Miyagi et al.

[11] Patent Number: 5,119,359
[45] Date of Patent: Jun. 2, 1992

[54] METHOD AND APPARATUS FOR FABRICATING AN OPTICAL DISC MASTER AND AN OPTICAL DISC

[75] Inventors: Masami Miyagi, Katsuta; Nobuhiro Funakoshi, Naka; Akira Iwasawa, Mito, all of Japan

[73] Assignee: Nippon Telegraph and Telephone Corporation, Tokyo, Japan

[21] Appl. No.: 574,282

[22] Filed: Aug. 29, 1990

Related U.S. Application Data

[63] Continuation of Ser. No. 176,866, Apr. 1, 1988, abandoned.

[30] Foreign Application Priority Data

| Apr. 8, 1987 | [JP] | Japan | 62-86265 |
| May 20, 1987 | [JP] | Japan | 62-121018 |
| May 29, 1987 | [JP] | Japan | 62-134108 |
| Aug. 10, 1987 | [JP] | Japan | 62-198243 |
| Mar. 2, 1988 | [JP] | Japan | 63-47619 |

[51] Int. Cl.$^5$ .................. G11B 7/24; G11B 7/26
[52] U.S. Cl. ........................ 369/109; 369/197; 369/275.3; 369/275.4
[58] Field of Search ............... 369/109, 107, 111, 116, 369/93, 17, 18, 278, 275.4, 277, 43, 44.11, 58, 51, 54; 360/77.11

[56] References Cited

U.S. PATENT DOCUMENTS

| 3,737,589 | 6/1973 | Redlich et al. | 369/17 |
| 3,943,302 | 3/1976 | Johnston, Jr. | 369/17 |
| 3,952,146 | 4/1976 | Plows et al. | 369/111 |
| 3,969,574 | 7/1976 | Jenseen et al. | 369/111 X |
| 4,085,423 | 4/1978 | Tsunoda et al. | 369/109 X |
| 4,094,010 | 6/1978 | Pepperl et al. | 360/77.11 X |
| 4,298,974 | 11/1981 | Tsunoda et al. | 369/93 X |
| 4,562,567 | 12/1985 | Frankfort et al. | 369/109 X |
| 4,646,279 | 2/1987 | Toneyawa | 369/109 |
| 4,783,776 | 11/1988 | Ishigaki et al. | 369/109 |
| 4,949,331 | 8/1990 | Maeda et al. | 369/111 X |

FOREIGN PATENT DOCUMENTS 62-84449 4/1987 Japan .

OTHER PUBLICATIONS

"Concentric Pregrooved Disk Fabricated by a Beam Scanning Method", Miyagi et al., *Japanese Journal of Applied Physics*, vol. 27, No. 1, Jan. 1988, pp. 88-90.
"Developments in Optical Disk Mastering", Pasman et al., *SPIE*, vol. 529, Optical Mass Data Storage (1985), pp. 62-68.
"Sector Servo Data File Optical Disk Memory", Yonezawa et al., *SPIE*, vol. 529, Optical Mass Data Storage (1985), pp. 84-88.

*Primary Examiner*—Roy N. Envall, Jr.
*Assistant Examiner*—Muhammad N. Edun
*Attorney, Agent, or Firm*—Spencer, Frank & Schneider

[57] ABSTRACT

A beam of light emitted from a light source and then modulated is focused through a write head onto a surface of a substrate which is coated with a photosensitive material and is rotated at a predetermined constant rotational speed. The write head and the substrate are displaced relatively in the radial direction of the substrate. While an optical axis of the beam of light is displaced in the direction in which the relative displacement speed between the write head and the substrate is decreased or increased, the substrate is exposed in such a way that a locus of a first turn or wind of predetermined tracks or pit arrays is recorded. Thereafter, while the substrate is rotated at the constant rotational speed, during the next rotation of the substrate the projection of the beam of light is interrupted and the optical axis of the beam of light is returned to its initial position. The above-described steps are repeated for recording the succeeding tracks or pit arrays, whereby a desired track pattern can be obtained.

14 Claims, 16 Drawing Sheets

METHOD AND APPARATUS FOR FABRICATING AN OPTICAL DISC MASTER AND AN OPTICAL DISC This application is a continuation of application Ser. No. 07/176,866, filed Apr. 1, 1988, now abandoned.

BACKGROUND OF THE INVENTION

1. Field of the Invention

The present invention relates to a method for fabricating an optical disc master, an apparatus best adapted to carry out the optical-disc-master fabricating method and an optical disc produced by a master produced by the optical-disc-master fabricating method.

2. Description of the Prior Art

In the case of optical discs of a type capable of recording additional data by users and reading out data, e.g. add-on writable optical discs, each optical disc is in general formed with tracks for permitting tracking of a read/write head or prepits for giving information signals.

As to types of tracks, there exist grooves used in a continuous servo system and wobble marks used in a sampled servo system.

Therefore, the term "tracks" is used to include grooves and wobble marks in this specification and the term "track pattern" is used to refer to a pattern recorded by a plurality of tracks or prepits.

In general, track patterns are divided into spiral pattern and concentric pattern.

One continuous spiral can be recorded by exposing a rotating substrate with a uniform displacement either of an optical system including a write head or the rotating substrate.

On the other hand, in the case of the concentric pattern, the tracks are discontinuous so that the relative displacement between the write head and the substrate cannot be carried out continuously simultaneously with the exposure.

In the case of a conventional method for forming a concentric track pattern, the relative displacement between the write head and the substrate and the exposure are carried out intermittently so that the exposure during one rotation of the substrate and the displacement by one pitch of a track on the substrate are alternately carried out.

More particularly, in the case of the conventional method for forming the concentric track pattern of the type described above, the relative displacement between the write head and the substrate is carried out by an intermittent energization of a motor so that there arise problems in that correct positioning is difficult and the degree of pitch accuracy is lower as compared with formation of a spiral track pattern.

As to methods for recording prepits, there are two methods and according to one method, prepits are recorded in a groove while according to the other method prepits are recorded on a land between adjacent grooves. Of various conventional methods for fabricating an optical disc master in which prepits are recorded on the land between adjacent grooves, there has been proposed and demonstrated a method in which recording is made by two light beams for grooves and prepits, respectively.

FIG. 14 shows a schematic construction of an apparatus adapted to carry out the conventional method for fabricating a master disc. According to this conventional method for producing a master disc, a substrate 15 is rotated at a predetermined rotational speed and displacement in a radial direction of the substrate 15 is carried out continuously at a predetermined speed at which the displacement is made by a predetermined pitch during one rotation of the substrate 15. A light beam emitted from an argon laser 11 is split by a half mirror 22 into two beams for recording grooves and prepits, respectively. The split beams are modulated in response to predetermined signals, respectively, in AO (Acousto-Optic) modulators 12 and then combined by a polarized beam splitter 26 so as to be applied to a write head 14 having a focus servo mechanism employing a semiconductor laser. The optic axes of the two light beams are so adjusted that they are focused on the substrate at the positions spaced apart from each other by one half of a predetermined pitch.

In the case of the master fabricating method of the type described above, the reflecting directions of the mirror must be adjusted so that the light beam for grooves and the light beam for prepits must be on the substrate at two points spaced apart from each other by, for instance, 0.8 $\mu m$ which is one half of a predetermined pitch with a positional accuracy of $\pm 0.03$ $\mu m$. Therefore, the apparatus becomes complicated in construction because one laser beam must be split into two beams and a high power recording laser is necessary so that the apparatus becomes very expensive.

Meanwhile, Japanese Patent Application Laid-Open No. 62-84449 discloses a method for recording a plurality (above three) of grooves simultaneously.

FIG. 15 shows a fundamental construction of a conventional apparatus capable of recording a plurality of grooves simultaneously. A laser beam emitted from a laser source (not shown) is made to pass through a expander (not shown) and a lens system (not shown), thereby obtaining a plurality of parallel beams 51. Thereafter, as shown in FIG. 16, these parallel beams 51 are made to pass downwardly through a portion which establishes multiple interference conditions by two reflecting plates 52 and 53 which intersect each other at an angle of inclination $\phi$. In this case, the angle of inclination between the two reflecting plates 52 and 53 is suitably selected in response to the wavelength $\lambda$ of the laser beam to be used so that an interference waveform having a period corresponding to a predetermined space Q between the adjacent grooves can be obtained. The interference waveform is shaped by a slit 54 and, furthermore, is mono-axially focused through a cylindrical lens 55. As a result, a plurality of bright points of light 57 are focused in the form of a linear array on a focal plane 56. It follows therefore that when the bright points 57 are focused on the substrate 15 which is rotated, a plurality of grooves can be simultaneously recorded.

According to the above-mentioned conventional method for recording simultaneously a plurality of grooves, the laser beam is split into a plurality of bright points and the energy of the laser beam is lost by absorption of light in the optical system shown in FIG. 15 so that a high-power laser is needed. Furthermore, each of the bright points cannot be modulated independently, and there exists a defect that it is difficult to record prepits.

SUMMARY OF THE INVENTION

In view of the above, it is an object of the present invention to provide a method and an apparatus which can substantially eliminate the above and other defects encountered in the conventional methods and apparatuses and which can be used to fabricate an optical disc master with a high degree of dimensional accuracy within a short period of time.

It is another object of the present invention to provide a method for fabricating an optical disc master by an apparatus which is relatively simple in construction and can be adjusted in a simple manner and which can record concentric tracks with a high degree of dimensional accuracy.

It is a further object of the present invention to provide a method for fabricating an optical disc master by an apparatus which is relatively simple in construction and can be adjusted in a simple manner and which can record prepits between adjacent tracks with a high degree of dimensional accuracy.

It is still another object of the present invention to provide a method for fabricating an optical disc master having a plurality of juxtaposed spiral tracks or pit arrays with a high degree of dimensional accuracy by using an apparatus which is relatively simple in construction and can be adjusted in a simple manner.

A further object of the present invention is to provide an optical disc having a high degree of tracking capability and a high data-packing density.

To the above and other ends, in the method for fabricating an optical disc master of the present invention, a light beam emitted from a light source and modulated is made to impinge on a surface of a substrate which is coated with a photosensitive material layer and is rotated at a predetermined constant rotational speed so that a track pattern is recorded on the surface of the substrate, while a write head and the substrate are displaced with respect to each other. After a first turn of predetermined tracks or pit arrays is exposed while the optical axis of the light beam is displaced or deflected in the direction in which the relative displacement between the write head and the substrate is decreased or increased. the projection of the light beam is interrupted in the succeeding one rotation of the substrate while the substrate is maintained to rotate at a predetermined constant rotational speed and the optical axis of the light beams is returned to the initial position, and the above-described steps are repeated to record the next track or pit array, whereby a desired track pattern is recorded.

Furthermore, in the case of the optical disc master fabrication method in accordance with the present invention, the optical axis of the light beam is displaced in the direction in which the relative displacement between the write head and the substrate is decreased while maintaining a distance between the center of the substrate and a focused point at a predetermined constant value, thereby recording concentric tracks.

In addition, according to the optical disc master fabrication method of the present invention, the optical axis of the light beam is displaced in the direction in which the relative displacement speed between the write head and the substrate is increased at a predetermined constant relative speed in such a way that the optical axis of the light beam is displaced by a predetermined pitch (Po) while the substrate rotates 2n times (where n: a positive integer) so that a locus of a first turn of spiral tracks or pit arrays having the predetermined pitch (Po) during the first rotation of the substrate. In the case of the second rotation of the substrate, the projection of the light beam is interrupted and the optical axis of the light beam is returned to its initial position, that is, the position advanced by Po/n from the locus-drawing starting point of the first rotation. Thereafter, during the third rotation of the substrate, the substrate is so exposed that the locus of the optical axis of the light beam records a track or pit array which is spaced apart by a predetermined distance Po/n from the track or pit array recorded during the first rotation of the substrate. Next, during the fourth rotation of the substrate, the projection of the light beam is interrupted and the optical axis of the light beam is returned to its initial position; that is, a position advanced by 2Po/n from the locus-drawing starting position in the first rotation. After the fifth rotation of the substrate, the above-described steps are repeated so that the substrate is exposed to record a first turn or wind of each of the number of n spiral tracks or pit arrays during the 2n rotations of the substrate. Thereafter, the optical axis of the light beam is returned to its initial position; that is, the position at which the recording of the first track or pit array was interrupted. Next the step of exposing a spiral track or pit array continuous with the first turn of the tracks or pit arrays during the (2n+1)-th rotation is repeated in a manner substantially similar to that made during the first rotation of the substrate. Thus, a track pattern having the number of n juxtaposed spiral tracks or pit arrays can be recorded.

The optical axis of the light beam is displaced by a device such as a galvanomirror, an AO deflector or a displacement mechanism in the radial direction, the device being incorporated in a write head.

The apparatus for fabricating an optical disc master in accordance with the present invention comprises driving means for rotating a substrate coated with a photosensitive agent at a predetermined speed laser light source; modulation means for modulating a laser beam emitted from the laser light source; a write head; guide means for directing a modulated laser beam to the write head; means for causing a relative movement between the write head and the substrate in the radial direction of the substrate; and an optical-axis deflecting means for deflecting the optical axis of the laser beam focused on the substrate in the direction of the relative displacement between the write head and the substrate.

The means for deflecting the optical axis of the laser beam is a galvanomirror, an AO deflector or a displacement mechanism in the radial direction and is incorporated in a recording head.

According to the present invention, in the case of the fabrication of a master, the predetermined constant rotational speed of the substrate and the relative displacement between the substrate and the write head are in a continuous operation which excludes the interruption and re-starting of the movement; the optical axis of a single beam of light is displaced in the direction in which the relative displacement speed is decreased or increased to expose the substrate; after the exposure has been interrupted, the optical axis of the light beam is returned to its initial position and the above-described steps are repeated.

As described above, it is not necessary to interrupt and re-start the movement of the substrate and the write head during the fabrication of a master, and an error due to the positioning of the substrate can be eliminated so that a track pattern can be recorded with a high degree of dimensional accuracy.

Moreover, a master having a concentric track pattern or a spiral track pattern having juxtaposed spiral tracks or pit arrays can be easily produced by displacing the optical axis of a single light beam by a predetermined distance in the direction in which the relative movement between the substrate and the write head is decreased or increased.

Furthermore, in accordance with the present invention, the means for displacing the optical axis of a light beam is provided so that movable component parts can be decreased in weight and a high degree of response can be attained.

Moreover, grooves and prepits between the adjacent grooves can be recorded by the displacement of the optical axis of a single beam of light so that a mastering apparatus can be made simple in construction, adjusted in a simple manner and becomes inexpensive to manufacture as compared with the conventional apparatus. In addition, the displacement of the optical axis can be controlled at a high degree of controllability so that the distances between the adjacent grooves and the prepits can be recorded at a high degree of accuracy.

According to the present invention, it becomes possible to produce optical discs which have a high data-packaging density and which permits the simultaneous writing or readout from a plurality of grooves or pit arrays so that the optical discs capable of the information transfer at a high rate can be provided.

The above and other objects, effects, features and advantages of the present invention will become more apparent from the following description of preferred embodiments thereof taken in conjunction with the accompanying drawings.

DETAILED DESCRIPTION OF PREFERRED EMBODIMENTS

Now, the present invention will be described in detail in conjunction with the accompanying drawings.

Figure 1:
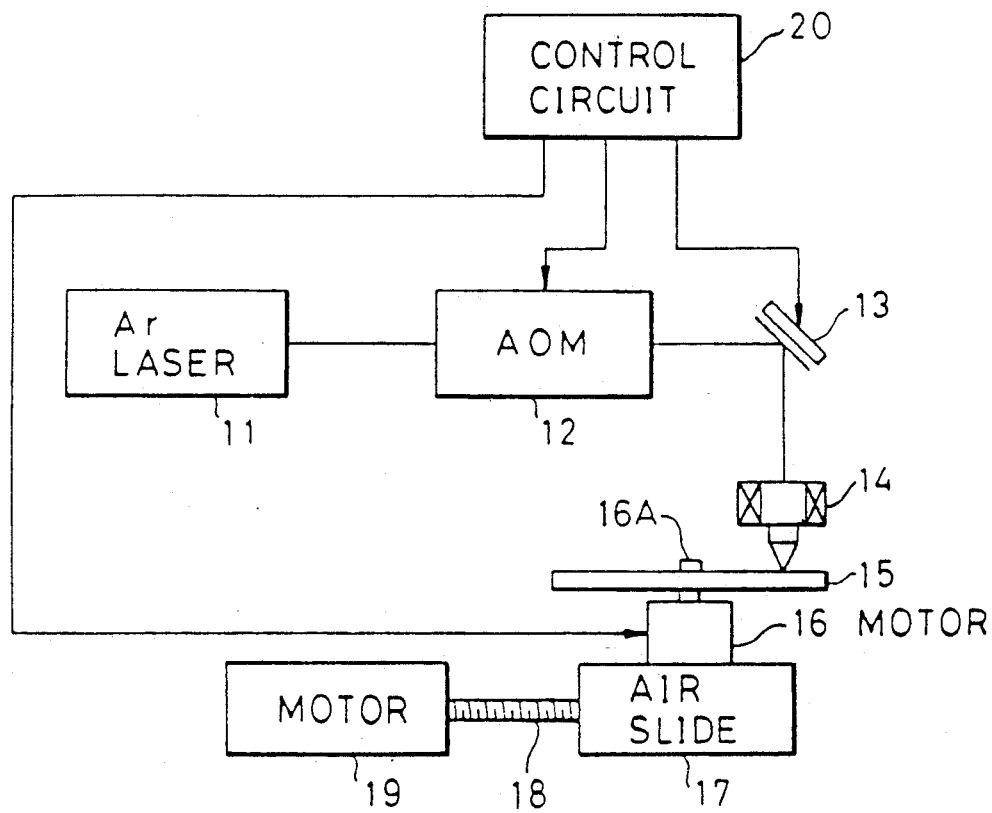
FIG. 1 is a schematic view showing a first embodiment of an apparatus for mastering in accordance with the present invention.
Figure 2:
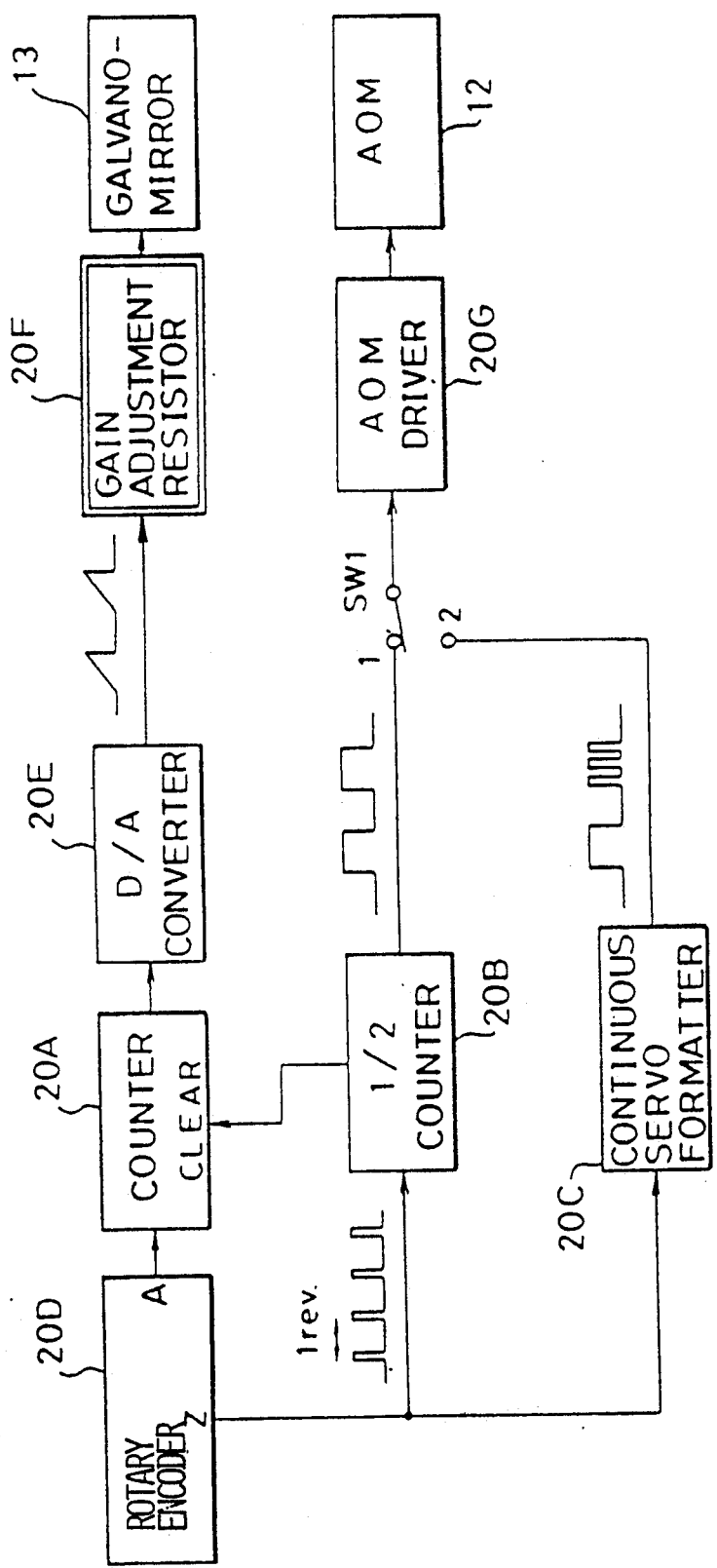
FIG. 2 is a block diagram of a control circuit thereof.

First, a schematic arrangement of a first embodiment of a mastering apparatus in accordance with the present invention is shown in FIGS. 1 and 2.

In FIG. 1, reference numeral 11 designates an argon laser; 12, an AO (Acousto-Optic) modulator; 13, a galvanomirror for displacing or shifting an optical axis; 14, a write or recording head; 15, a glass substrate coated with a photosensitive agent; 16, a motor for rotating the substrate 15; 16A, a spindle thereof; 17, an air slide; 18, a ball screw or lead screw; 19, a DC servomotor for displacing the substrate 15; and, 20, a control circuit. The write head 14 includes a focus servo mechanism utilizing a laser beam. In the first embodiment, the laser beam emitted from the argon laser 11 passes through the AO modulator 12, the galvanomirror 13 and the write head 14 in the order named and impinges on the substrate 15 fitted on the spindle 16A of the substrate driving mechanism comprising the substrate rotating motor 16, the air slide 17, the ball screw or lead screw 18 and the DC servo motor 19 for displacing the substrate. The substrate rotating motor 16, the AO modulator 12 and the galvanomirror 13 are controlled by the control circuit 20.

Referring next to FIG. 2, the control circuit 20 will be described. In FIG. 2, reference numeral 20A represents a counter; 20B, a ½ counter; 20C, a continuous servo formatter; and 20D, a rotary encoder mounted on the substrate rotating motor 16.

In response to the rotation at a predetermined constant speed of the spindle 16A under a PLL (Phase Locked Loop) control, the encoder 20D produces an A signal (2000 pulses per rotation) and a Z signal (1 pulse per rotation) as a rotation synchronous signal.

The A signal (2000 pulses per rotation) is applied to the counter 20A.

The Z signal (1 pulse per rotation) is applied to the ½ counter 20B and the continuous servo formatter 20C.

The counter 20A is connected through a D/A converter 20E and a gain adjustment resistor 20F to the galvanomirror 13.

The ½ counter 20B and the continuous servo formatter 20C are connected through a switch SW1 and an AOM (Acousto-Optic Modulator) driver 20G to the AO modulator.

In the mastering apparatus, a galvanomirror which is the product of Nippon Electric Sanei Corp., 3404-(A) can be used as the galvanomirror 13.

Figure 3:
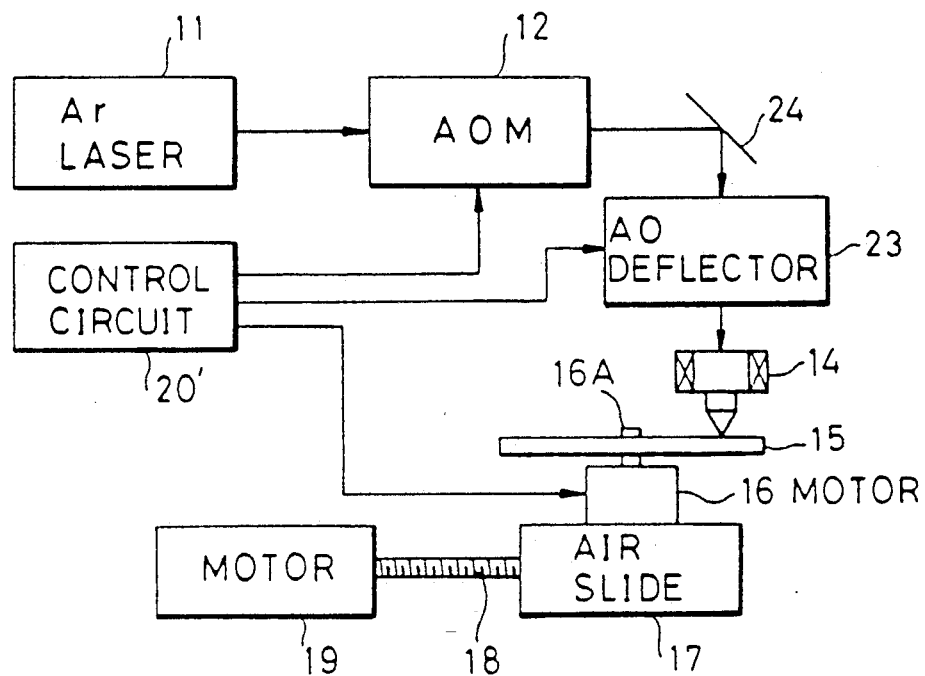
FIG. 3 is a schematic view showing a second embodiment of an apparatus for mastering in accordance with the present invention.
Figure 4:
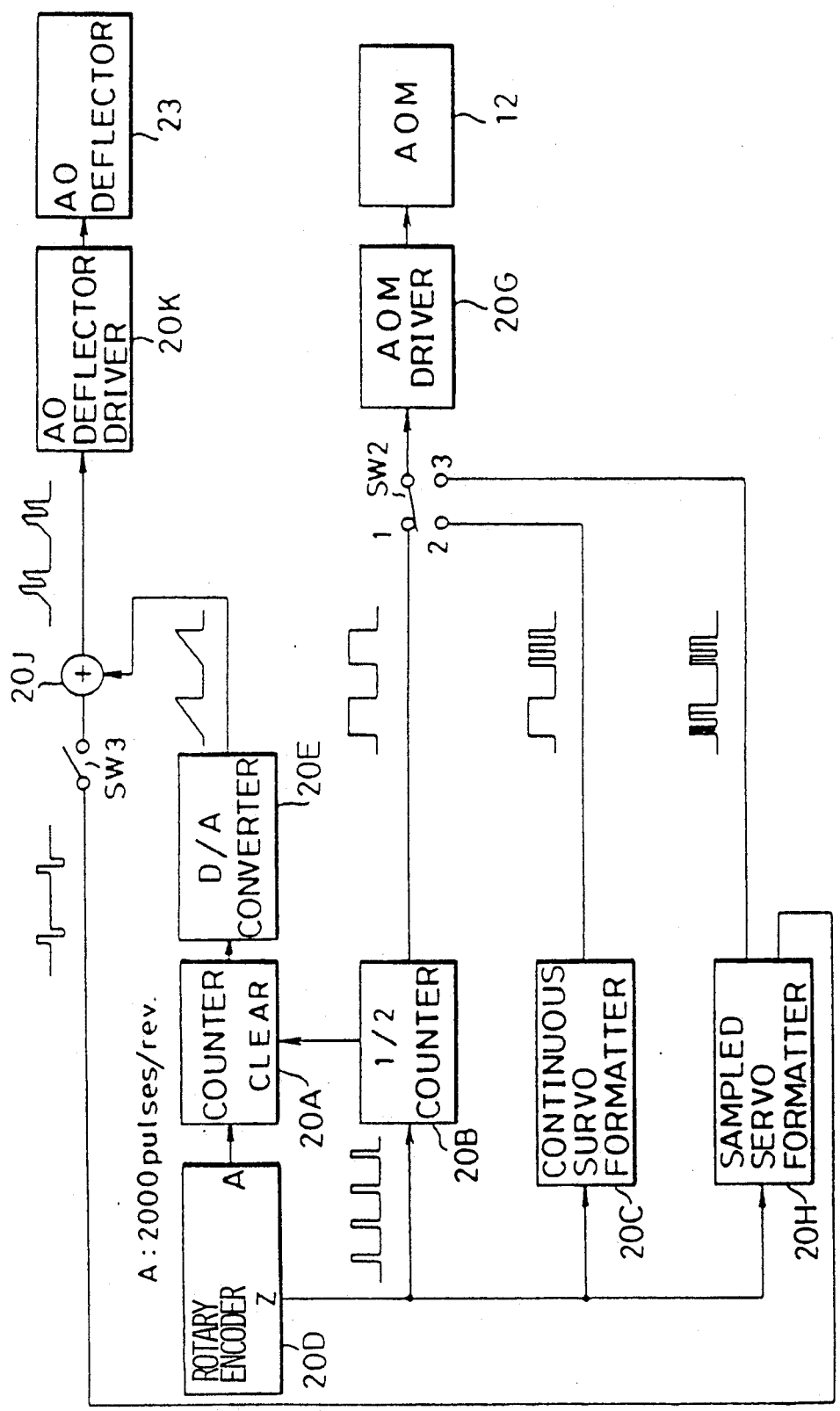
FIG. 4 is a block diagram of a control circuit thereof.

Next, a second preferred embodiment of a mastering apparatus used in the present invention is schematically shown in FIGS. 3 and 4.

In the second embodiment, instead of the galvanomirror, an AO deflector 23 is used as an optical-axis displacement means. The laser beam transmitted through the AO modulator 12 is reflected by a mirror 24 to the AO deflector 23.

Except for the above arrangement, the second embodiment is substantially similar in construction to the first embodiment so that the same reference numerals are used to designate similar parts in both of the first and second embodiments and further explanation of these parts shall not be made.

In the second embodiment, a control circuit 20' includes a sampled servo formatter 20H as shown in FIG. 4.

The Z signal (1 pulse per rotation) from the rotary encoder 20D is applied to the sampled servo formatter 20H which in turn delivers a modulated signal in response to a sampled servo format. In synchronism with the generation of a signal for wobble marks in the modulation signal, a wobble mark signal for driving the AO deflector 23 is delivered. The modulation signal output is applied through a selection switch SW2 to the AOM driver 20G. Also the wobble mark signal output is applied through a switch SW3 to an adder 20J.

The counter 20A is also connected through the D/A converter 20E to the adder 20J which in turn is connected through the AO deflector driver 20K to the AO deflector 23.

Models 1206C and D323B which are products of ISOMET Corp., can be used as the AO deflector 23 and the AO deflector driver 20K, respectively.

Figure 5:
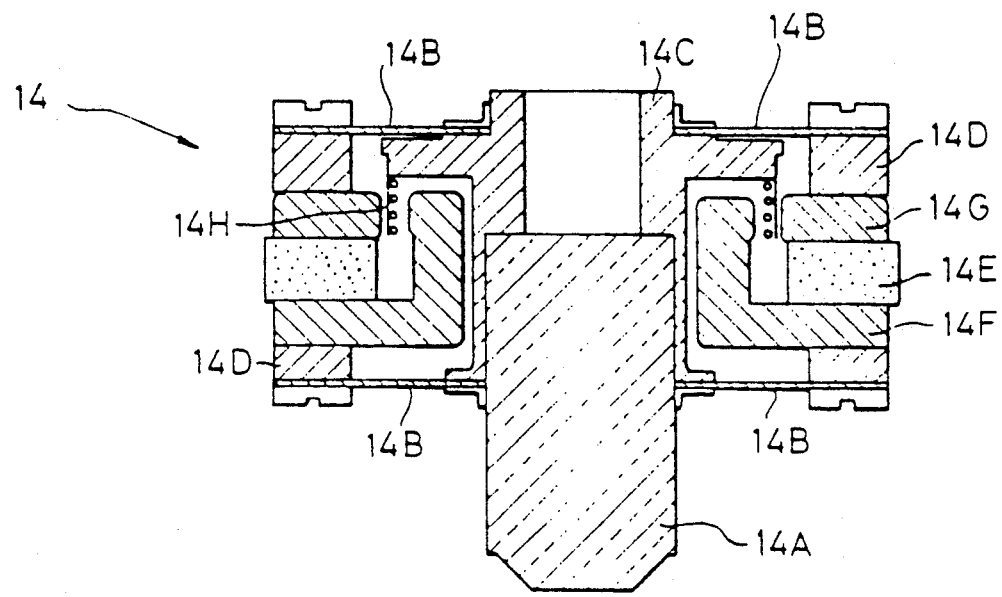
FIG. 5 is a sectional side view showing a recording head employed in the apparatuses for mastering shown in FIGS. 1 and 3 in accordance with the present invention.

A write head 14 used in the first or second embodiment shown in FIG. 1 or 3 suffices to have a focus servo mechanism and is, for instance, of the type shown in FIG. 5.

In FIG. 5, an objective lens 14A is held by a holder 14C suspended from the leading ends of leaf springs 14B whose other ends or bases are securely attached to supporting frames 14D which clamp a magnet 14E and support a first yoke 14F and a second yoke 14G.

A coil 14H mounted around the holder 14C is interposed between the first yoke 14F and the second yoke 14G and the objective lens 14A is vertically moved by varying the magnitude of current flowing through the coil 14H.

Figure 6:
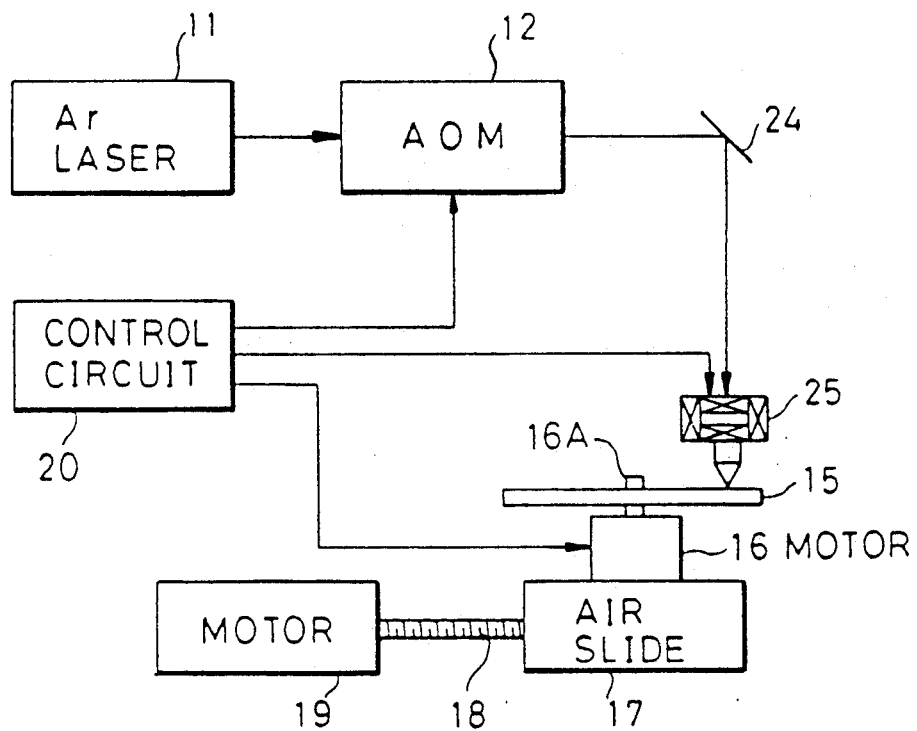
FIG. 6 is a schematic view of a third embodiment of an apparatus for mastering in accordance with the present invention.
Figure 7:
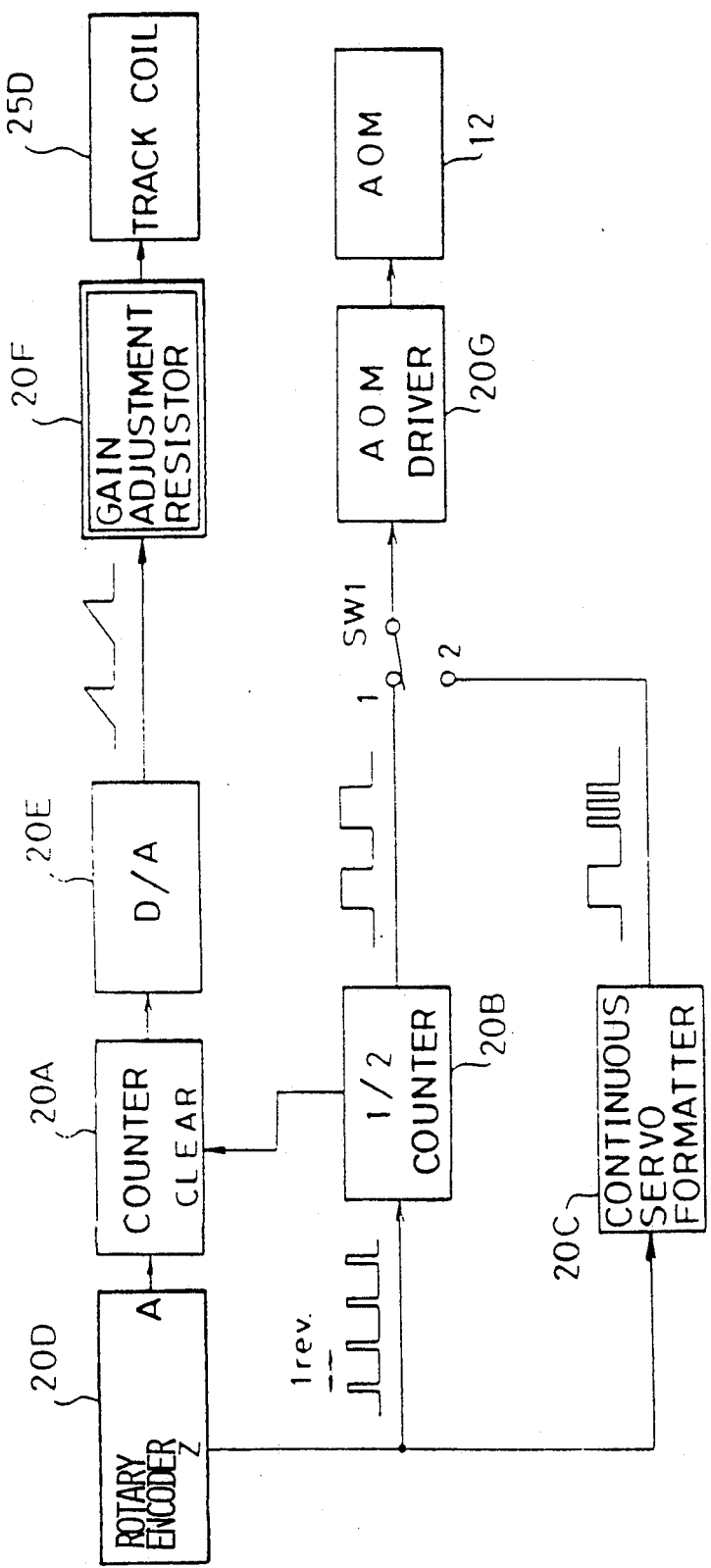
FIG. 7 is a block diagram of a control circuit thereof.

A third embodiment of a mastering apparatus used in the present invention is schematically shown in FIGS. 6 and 7.

In the third embodiment, instead of the AO deflector 23, a write head 25 is provided which is equipped with an objective-lens displacement mechanism; that is, a tracking servo mechanism which causes the displacement of the objective lens in a radial direction is used. When a signal is applied to a track coil, the displacement mechanism can displace the light beam on the substrate 15 in the radial direction. The write head 25 is, for instance, of the type as shown in FIGS. 8A and 8B.

Figure 8A:
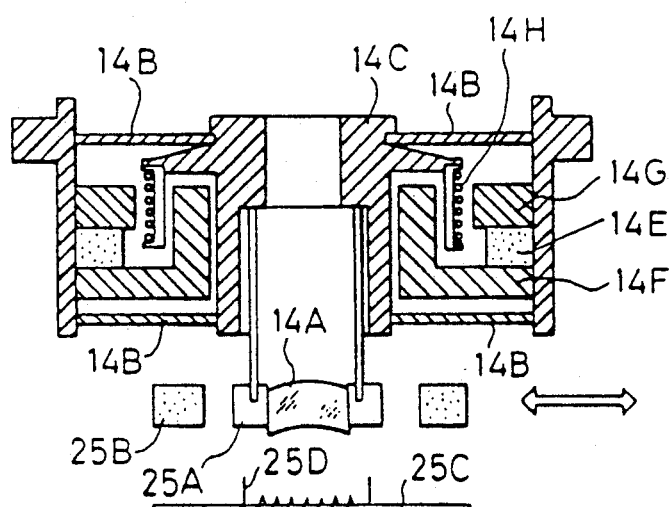
FIG. 8A is a sectional side view, and FIG. 8B, a bottom view, showing a recording head employed in the apparatus for mastering shown in FIG. 6.
Figure 8B:
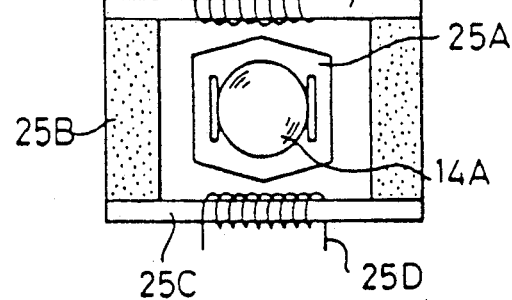

The write head 25 shown in FIGS. 8A and 8B is a focus servo mechanism which is substantially similar in construction to the write head 14 as shown in FIG. 5 so that the same reference numerals, are used to designate similar parts and no further explanation of these parts shall be made.

In addition to the focus servo mechanism, the write head 25 has an iron member 25A fitted over the leading end portion of the objective lens 14A and can vary the quantity of electric current flowing through the track coil 25D wound around a yoke 25C which is brought into contact with a magnet 25B.

Therefore, it becomes possible to displace the objective lens 14A in the radial direction.

The control circuit 20 and other arrangements are substantially similar in construction and mode of operation to the control circuit 20 of the first embodiment so that the same reference numerals are used to designate similar parts and no further explanation of these parts shall be made in this specification.

The control signal from the gain adjustment resistor 20F is transmitted to the track coil 25D for displacing the write head 25 in the radial direction.

In the first, second and third embodiments described above, the model 1250C and the model 225A-1 which are the products of ISOMET Corp., can be used as the AO modulator 12 and AOM driver 20G, respectively.

Next, a fabrication of an optical disc master by the mastering apparatus of the types described above will be explained.

EXAMPLE 1

First, a method for recording a concentric groove pattern by the mastering apparatus shown in FIGS. 1 and 2 will be explained.

Figure 9:
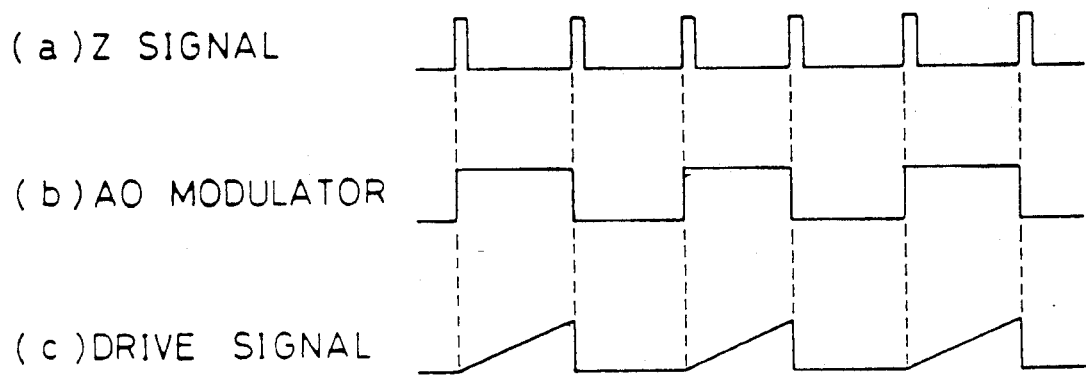
FIG. 9(a)-(c) shows an operating timing chart when concentric grooves are recorded by the mastering apparatus shown in FIG. 1.

FIG. 9 is a timing chart in the case of fabrication of concentric grooves.

The switch SW1 in the control circuit 20 is placed into contact with stationary contact 1. Under the PLL control the spindle 16A rotates at a constant rotational speed and the rotary encoder 20D incorporated in the motor 16 generates the rotation sync signals, that is the signal A (2000 pulses per revolution) and the signal Z (one pulse per revolution). The linear displacement of the substrate 15 in the radial direction of the substrate 15 is continuously carried out by the DC servomotor 19 at a displacement speed at which the substrate 15 is displaced by one pitch of a track pattern per two rotations of the substrate 15. The displacement speed control of the substrate 15 is controlled at a predetermined constant speed by a tachogenerator (tachometer) incorporated in the motor 19. At the start of recording, an exposure is made by turning on the signal represented by (b) in FIG. 9 of the AO modulator 12 simultaneously with the Z signal represented by (a) in FIG. 9. Concurrently, the control circuit 20 applies to the galvanomirror 13 a sawtooth-waveform signal represented by (c) in FIG. 9 so that the angle of the galvanomirror 13 is varied continuously. The ON-OFF signals from the AO modulator 12 are produced by applying the Z signal to the ½ counter 20B while the drive signal represented by (c) in FIG. 9 to be applied to the galvanomirror 13 is produced by applying the A signal to the counter 20A and then converting into the analog signal by the D/A converter 20E. During the exposure, the direction of the linear displacement of the projected or focused point of the beam of light relative to the recording head 14 is maintained so as to be the same as the direction of the displacement of the substrate 15, and the angle of the galvanomirror 13 is continuously varied so that the distance between the position of the beam of light projected on the substrate 15 and the center of revolution of the substrate 15 can be maintained at a predetermined constant value during each revolution. The drive signal applied to the galvanomirror 13 is previously adjusted by the gain adjustment resistor 20F so that the peak value of the sawtooth-waveform signal corresponds to the displacement of the projected point of the beam of light by ½ pitch.

Figure 10:
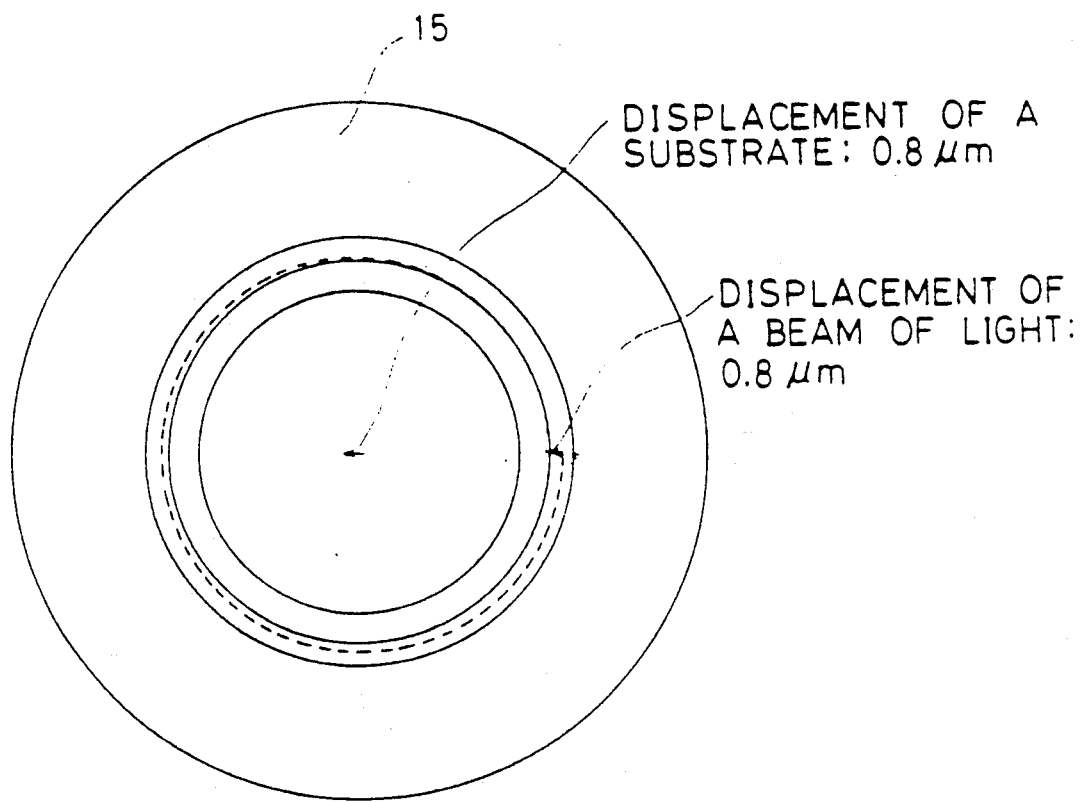
FIG. 10 is a top view illustrating a method for recording concentric grooves having a 1.6 $\mu$m pitch.

Thereafter, simultaneously with the generation of the second Z signal, the AO modulator 12 is turned off so that the exposure is interrupted and therefore the recording of one groove is accomplished. Concurrently, the galvanomirror driving signal is turned off and galvanomirror 13 is returned to its initial angle. Next the operation is interrupted for a period of time equal to the time for one revolution of the substrate 15 while the rotation of the substrate 15 and the displacement in the radial direction of the substrate 15 continue. In response to the generation of the third occurrence of the Z signal, the signals for driving the galvanomirror 13 and the AO modulator 12 are turned on to start the exposure of the second groove. During the exposure of the second groove, the exposure step is carried out substantially the same as that described above in the case of the exposure of the first groove. The concentric grooves thus fabricated are shown in FIG. 10 in which the solid lines represent the grooves recorded while the broken line represents the case in which the projected point of the beam of light is not displaced by the galvanomirror 13 during the steady displacement of the substrate 15 shown by the arrow at the center of the substrate 15 in FIG. 10. The above-described steps are repeated until a predetermined number of grooves are exposed. Thus the recording of concentric grooves is completed.

A glass substrate 15 was coated with photoresist 100 nm in thickness by a spin coating process and then was mounted on the mastering apparatus shown in FIG. 1 to record the concentric grooves. The rotational speed of the substrate was maintained at 1800 rpm and the displacement speed of the substrate 15 was determined at 24 μm per second; that is, the groove pitch was selected at 1.6 μm. The time required for accomplishing the recording was about 20 minutes when the diameters of the grooves were between 60 and 120 mm. In other words, the recording time was only one half of the time required for recording by the conventional method for fabricating a master with a concentric groove pattern. Thereafter the recorded substrate 15 was developed so that a glass master with a concentric groove pattern was obtained.

An Ni film was grown 40 nm over the surface of the master with a concentric groove pattern by a vacuum evaporation process.

Next, the master which was made conductive by the Ni film was plated with Ni, whereby an Ni stamper was prepared. The thickness of the Ni stamper was 300 μm. Thereafter, the Ni stamper was separated from the glass substrate 15 and the remaining photoresist was removed, a useless portion around the periphery was cut off and the rear surface was polished Next, the Ni stamper was mounted in an injection-molding machine to produce optical disc substrates. Polycarbonate was used to fabricate the substrates and the optical disc substrate which was 130 mm in diameter and 1.2 mm in thickness and which was transferred with a concentric groove pattern was obtained.

The groove pitch between 100 continuous grooves was measured by an optical microscope in 12 radial directions equi-angularly spaced apart from each other by 30°. In each direction, the average groove pitch was 1.6 μm with variations less than ±0.03 μm and no discontinuity of the grooves was observed. Furthermore, the optical disc substrate was mounted on a write/read apparatus employing a semiconductor laser to test the degree of trackability. The results showed that the tracking operation was stable. Therefore, it was confirmed that each groove was in the form of a closed true circle so that the perfect concentric grooves were recorded.

EXAMPLE 2

Next, a method for fabricating a concentric groove pattern by using the second mastering apparatus of the type shown in FIGS. 3 and 4 will be described. In this case, the timing chart is substantially similar to that shown in FIG. 9 in the case, of the fabrication by the first mastering apparatus, but the signal (c) becomes the AO deflector driving signal instead of the driving signal for driving the galvanomirror.

First, the movable contact of the selection switch SW2 in FIG. 4 is made into contact with stationary contacts 1 while the switch SW3 is kept opened.

Simultaneously with the generation of the rotation sync signal or the Z signal (one pulse per revolution), the AO modulator 12 is turned on, thereby starting the exposure step. Concurrently the driving signal (c) is applied to the AO deflector 23. The optical axis is displaced in a direction which is the same as the direction of the displacement of the substrate 15 and is controlled in such way that the distance between the focused point on the substrate 15 of the beam of light and the center of rotation of the substrate 15 can be maintained constant throughout each revolution of the substrate 15 during which exposure occurs, so that the exposure is made in such a way that the optical axis draws a true circular locus about the center of the substrate 15.

The signal for turning on or off the AO modulator 12 is obtained by applying the Z signal to the ½ counter 20B which is then applied through the switch SW2 to the AOM driver 20G. The signal (c) for driving the AO deflector 23 is obtained by applying the A signal (2000 pulses per rotation) to the counter 20A and then converting into the analog signal by the D/A converter 20E. The driving signal (c) thus obtained is applied to the adder 20J and the AO-deflector driver 20K.

Simultaneous with the generation of the second Z signal, the AO modulator 12 is turned off to interrupt the exposure so that one groove is recorded. Concurrently, the signal for driving the AO deflector 23 is turned off so that the optical axis is returned to its initial position relative to the write head 14. While the rotation and the displacement in the radial direction of the substrate 15 are continued, the exposure step is interrupted for a time equal to the time required for revolving the substrate 15 one turn.

Next, simultaneously with the generation of the third Z signal, the driving signals for driving the AO modulator 12 and the AO deflector 23 are generated so that the recording of the second groove is started. In this case, the exposure is substantially the same as that for recording the first groove.

The above-mentioned steps are repeated until a desired number of grooves are recorded Thus, the recording of the concentric grooves is completed.

The second embodiment of the present invention will be described in more detail hereinafter.

A photoresist was coated by a spin coating process over the surface of a glass substrate 100 nm in thickness and the substrate 15 was mounted on the mastering apparatus shown in FIG. 3 to record concentric grooves. The rotational speed of the substrate 15 was 1800 rpm and the displacement speed thereof was 24 μm per second so that the groove pitch was selected at 1.6 μm. The time required for recording was about 20 minutes when the groove was 60-120 mm in diameter and was one half of the time required for producing a master with concentric grooves by a conventional master fabrication method. Next the substrate 15 thus exposed was developed to obtain a glass master with a concentric groove pattern.

Thereafter, the master with a concentric groove pattern thus obtained was coated with an Ni film 40 nm in thickness. Next, the surface of the master which became conductive by coating the Ni film was plated with Ni, whereby an Ni stamper was prepared. The thickness of the Ni stamper was 300 μm. Thereafter, the Ni stamper was separated from the glass substrate 15, the remaining photoresist was removed, a useless potion around the periphery of the substrate 15 was cut off and the rear surface of the substrate 15 was polished. The Ni stamper thus obtained was mounted in an injection-molding machine to produce optical disc substrates made of polycarbonate. Thus, an optical disc substrate 130 mm in diameter and 1.2 mm in thickness having a concentric groove pattern was obtained.

The groove pitch was measured by an optical microscope for continuous 100 grooves in 12 radial directions of the optical disc substrate equi-angulary spaced apart from each other by 30°. The results were that in each direction, the average groove pitch was 1.6 μm and the variations were within ±0.03 μm and the discontinuity of each groove was not observed. Furthermore, the optical disc substrate 15 was mounted on a write/read apparatus utilizing a semiconductor laser in order to test the tracking capability. The results were that the tracking capability is stable so that each groove is in the form of a closed true circle. Thus it was confirmed that the nearly perfect concentric grooves were recorded.

EXAMPLE 3

Next, a method for recording concentric prepit arrays with wobble marks by the second apparatus as shown in FIGS. 3 and 4 will be described.

It is assumed that the rotational speed of the spindle 16A, i.e. of the substrate 15, and the radial displacement speed of the spindle 16A are the same as those in the second embodiment, and the movable contact of the switch SW2 in the control circuit 20' is placed into contact with the third stationary contact 3 while the switch SW3 is closed.

Figure 11:
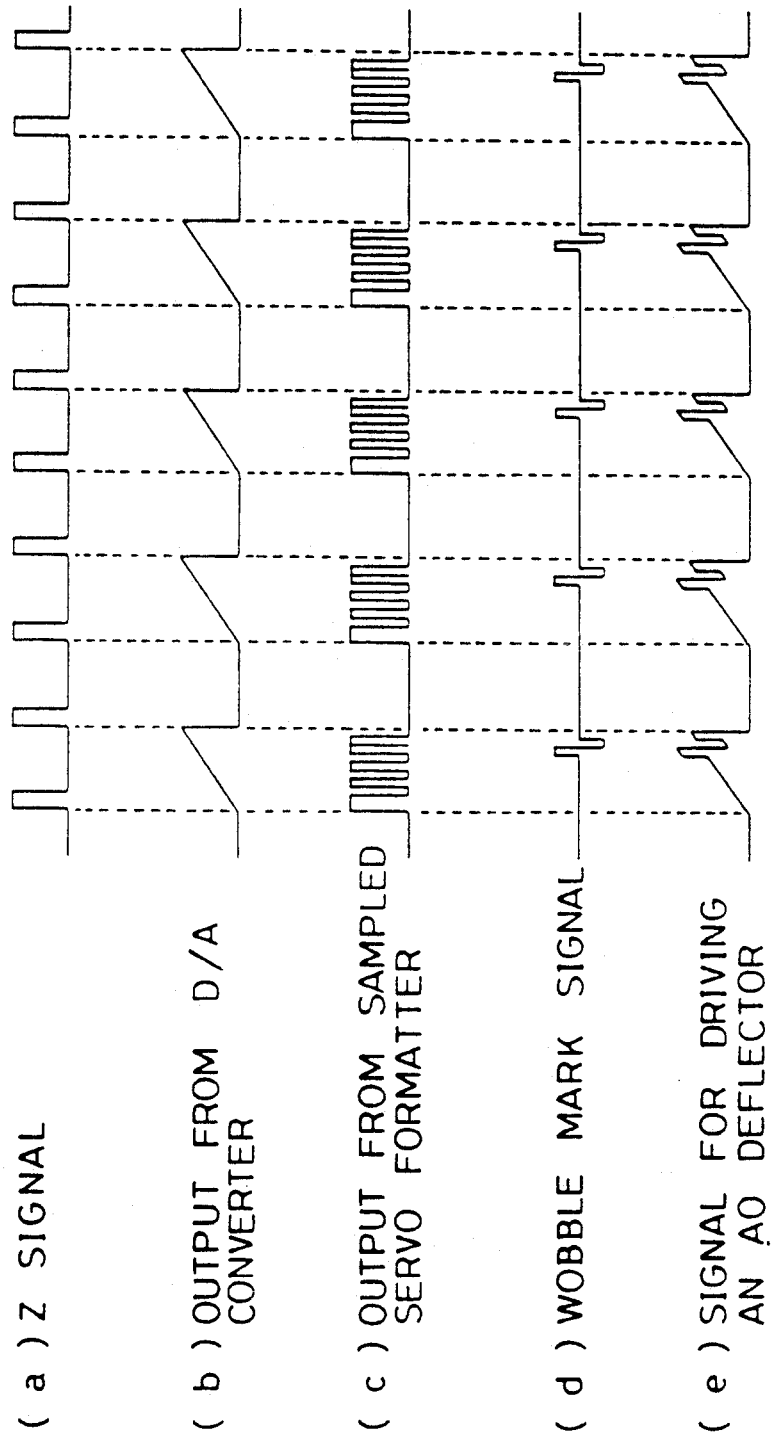
FIG. 11(a)-(e), is an timing chart in the case of recording concentric wobble marks by the mastering apparatus shown in FIG. 3.

In response to the Z signal from the encoder 20D, the sampled servo formatter 20H generates the prepit signal including a wobble mark signal at the rate of one signal per two rotations of the substrate 15 as indicated by the curve (c) FIG. 11.

The output thus obtained is applied as a modulation signal to the AO modulator 12 through the switch SW2 and the AOM driver 20G.

Concurrently the sampled servo formatter 20H generates positive and negative pulse signals as shown in the curve (d) of FIG. 11 as a wobble mark signal.

Because the switch SW3 is closed, the sawtooth signal as shown in FIG. 11(b) derived from the D/A converter 20E is added to the wobble mark signal in the adder 20J so that their sum is applied to the AO deflector driver 20K.

The AO deflector driver 20K includes a voltage-to-frequency converter so that the AO deflector driving signal as shown in the curve (e) of FIG. 11 is converted into a signal whose frequency varies and which in turn is applied to the AO deflector 23.

The laser beam incident on the AO deflector 23 through the mirror 24 is varied through a reflection angle in response to the variations of the frequency in response to the deflector driving signal and is emitted to record an imaginary locus of a concentric circle and prepits on the surface of the substrate 15 through the write head 14, whereby wobble marks are recorded along the above-mentioned imaginary concentric circle locus.

Next, the third embodiment of the present invention will be described in more detail hereinafter.

A photoresist was coated to 160 nm in thickness over the surface of a glass substrate 15 by a spin coating process and then was mounted on the mastering apparatus as shown in FIG. 3 so that pit arrays including wobble marks was concentrically recorded. The rotation speed of the substrate was 1800 rpm; the displacement speed thereof was 24 μm per second; and therefore the distance between the adjacent pit arrays was 1.6 μm. The recording time was about 20 minutes when the pit arrays were 60 to 120 mm in diameter. After the recording, the glass substrate was developed so that an optical disc master was obtained.

Thereafter, by following the same procedure as in the first example, an optical disc substrate was produced from the optical disc master.

The distance between the adjacent 100 continuous pit arrays was measured by an optical microscope in 12 radial directions equi-angularaly spaced apart from each other by 30°. The results were that the average value of the distance between the adjacent pit arrays in every direction was 1.6 μm and the variations were less than ±0.03 μm. And it was found that the wobble marks were recorded at positions deviated by 0.4 μm from the centerline of each pit array. Thereafter the optical disc substrate was mounted on a recording/reproducing apparatus utilizing a semiconductor laser to test the degree of tracking capability. The result was that the tracking operation and it was confirmed that the pit arrays were arranged into a concentric pattern.

EXAMPLE 4

Next, a method is described for recording a spiral groove and prepits between adjacent grooves forming a spiral by the first mastering apparatus as shown in FIGS. 1 and 2.

First, the movable contact of the switch SW1 is placed into contact with the stationary contact 2.

Figure 12:
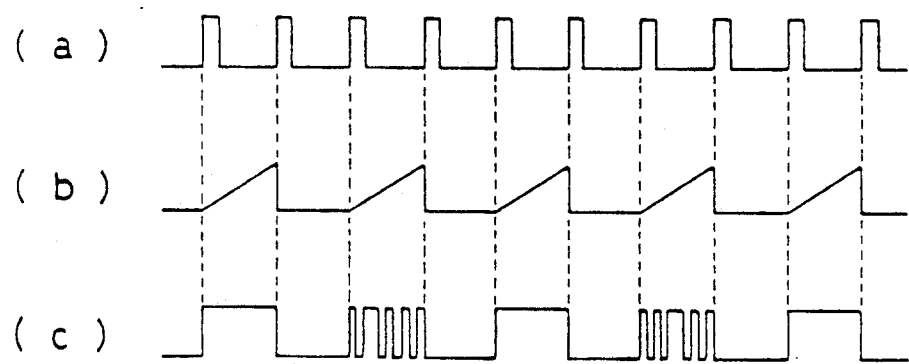
FIG. 12(a)-(c) is an operation timing chart in the case of recording a spiral groove and prepits by the mastering apparatus shown in FIG. 1.

A fabrication of a spiral groove and prepits by the first mastering apparatus is carried out according to the timing chart shown in FIG. 12. In FIG. 12, the curve (a) shows a Z signal generated each revolution of the substrate 15; the curve (b) shows a driving signal to be applied to the galvanomirror 13; the curve (c) shows a driving signal applied from the continuous servo formatter 20C through the selection switch SW1 to the AO modulator 12 and which corresponds to the ON-OFF operation of the laser beam. The substrate 15 is rotated at a predetermined constant speed and the rotation sync pulse signal shown in (a) of FIG. 12 generated each revolution of the substrate 15.

The displacement mechanism for linearly displacing the substrate 15 is continuously driven at a predetermined constant speed so that the substrate 15 is linearly displaced by one pitch of the spiral for every four rotations of the substrate 15.

In the case of the start of recording, simultaneously with the generation of the Z signal, the AO modulator 12 is turned on to start an exposure of a groove. Concurrently, a signal is applied to the galvanomirror 13 so that the optical axis of the beam of light is displaced linearly relative to the recording head 14 in a direction opposite to the direction in which the substrate 15 is linearly displaced, and then the exposure is carried out, whereby one turn or wind of the spiral groove having a predetermined pitch is recorded.

Next, in response to the generation of the second Z signal, the AO modulator 12 is turned off so that the exposure is interrupted and furthermore the driving signal applied to the galvanomirror 13 is turned off so that the optical axis is returned to its initial angle or position relative to the recording head 14. Thereafter, the exposure is kept interrupted for one revolution of the substrate 15 while the rotation and the radial displacement of the substrate 15 continue. After this revolution, the substrate 15 is located at a position advanced by ½ of the pitch of the spiral from the position at which the recording is started. Next, in response to the generation of the third Z signal, the signals for driving the AO modulator 12 and the galvanomirror 13 are turned on and then the exposure of the prepits is started. As in the case of the exposure of the first wind or turn of the spiral groove, the optical axis is displaced in such a way that the beam of light focused on the substrate 15 records one wind or turn locus of the spiral groove at a predetermined pitch. In other words, the beam of light is displaced to record a prepit array spaced apart by ½ pitch from the first wind or turn of the spiral groove. Next, simultaneously, with the generation of the fourth Z signal, the AO modulator 12 is turned off, thereby interrupting the exposure and the driving signal applied to the galvanomirror 13 is also turned off, so that the optical axis is returned to its initial position relative to the recording head 14. The exposure step is interrupted during one rotation of the substrate 15 while the rotation and the radial displacement of the substrate 15 are continued. After this revolution the substrate 15 is displaced to the position which is spaced apart by one pitch from the position at which the exposure or recording is started and the first wind or turn of the spiral groove and the prepits are completed. In response to the fifth Z signal, the driving signals for driving the AO modulator 12 and the galvanomirror 13 are turned on, and a wind or turn continuous with the first wind or turn of the spiral groove is exposed. The steps in the exposure operation are substantially the same as those for recording the first wind or turn of the spiral groove. When one wind or turn of the spiral groove and one prepit array are alternately carried out repeatedly described above, the recording of the continuous spiral groove and prepits are accomplished.

EXAMPLE 4 of the present invention will be more particularly described hereinafter. A photoresist was coated to 160 nm in thickness over the surface of a glass substrate 15 by a spin coating process and the glass substrate 15 was mounted on the mastering apparatus of the type described above to record a spiral groove and a spiral prepit array. The rotational speed of the substrate 15 was 1800 rpm and the displacement speed thereof was 12 µm per second so that the groove pitch was 1.6 µm. Thereafter the exposed substrate 15 was developed to obtain a master with a groove pattern and a prepit pattern.

Next, following the procedure of EXAMPLE 1, the master thus obtained is used to make an optical disc substrate.

The space between the groove and the prepit array of the disc substrate was measured. The measurements were made by an optical microscope in 12 radial direction angularly spaced apart from each other by 30° for 100 winds or turns. The average pitch between the groove and the prepit array was 0.8 µm and the variations less than ±0.03 µm. In this case, the discontinuity of the groove and the prepit array was not observed.

Furthermore, the disc substrate 15 was mounted on a write/read apparatus utilizing a semiconductor laser in order to evaluate the tracking capability. The result was that the tracking operation was stable, and therefore the groove and prepit array were in the form of spiral. In addition, high-quality read signals were obtained from the prepits.

EXAMPLE 5

Next, a method for recording a spiral groove and a spiral array of prepits by the second mastering apparatus shown in FIGS. 3 and 4 will be described.

EXAMPLE 5 is substantially similar to EXAMPLE 4 just described above except that the AO deflector 23 is used to displace the optical axis. However the movable contact of the selection switch SW2 is placed into contact with the stationary contact 2 while the switch SW3 is opened.

A photoresist of 160 nm in thickness was coated over the surface of a glass substrate 15 by a spin coating process and the glass substrate 15 was mounted o the second mastering apparatus to record a spiral groove and a prepit array in the form of spiral. The recording conditions were substantially similar to those of the above-described EXAMPLE 4. Next the exposed substrate was developed to obtain a master.

Following the procedure of EXAMPLE 1, a disc substrate was made from the master thus obtained.

Thereafter, following the procedure of the above-described EXAMPLE 4, measurement of the distance between the adjacent groove and the prepit array and a test of the tracking capability were made. The results were that the average distance between the spiral groove and the prepit array was 0.8 µm with variations of less than ±0.03 µm and that any discontinuity of the spiral groove and the prepit array in the form of the spiral was not observed. The tracking operation was carried out in a stable manner and it was confirmed from this operation that the groove and the prepit array were in the form of spiral. High-quality read signals were obtained from the prepits.

EXAMPLE 6

A method for recording a spiral groove and a spiral prepit array by the third mastering apparatus described above with reference to FIGS. 6 and 7 as in the cases of EXAMPLES 4 and 5 will be described.

EXAMPLE 6 is substantially similar to EXAMPLE 4 except that a signal is applied to the track coil 25D of the write head 25 to displace the optical axis. The movable contact of the switch SW1 in the control circuit 20 is placed into contact with the stationary contact 2 and a signal is applied from the continuous servo formatter 20C through the selection switch SW1 to the AOM driver 20G.

EXAMPLE 6 will be described in more detail hereinafter. A photoresist was coated to 160 nm in thickness over the surface of a glass substrate 15 by a spin coating process and the glass substrate 15 was mounted on the third mastering apparatus to record a spiral groove and a spiral prepit array. The rotational speed and the displacement speed of the substrate were 1200 rpm and 8 µm per second respectively. Therefore, the groove pitch was 1.6 µm. Next the exposed substrate was developed to obtain a master.

Thereafter, following the procedure of EXAMPLE 1, a disc substrate was prepared.

Following the above-mentioned EXAMPLE 5, the distance between the adjacent groove and the prepit array was measured and the tracking capability was tested. The results show that the average value of the distance between the groove and the prepit array was 0.8 μm with variations of less than ±0.03 μm and discontinuity at the joints of the grooves and the prepit arrays was not observed. The tracking operation was carried out in a stable manner and it was confirmed from the stable tracking operation that the groove and the prepit array were both in the form of a spiral. High-quality signals are obtained from the prepits.

Next, a method for fabricating a master having a number of n (n=a positive integer) juxtaposed spiral grooves or juxtaposed spiral grooves and pit arrays will be described.

EXAMPLE 7

First, a method for fabricating a master having the number of n (where n is positive integer) juxtaposed spiral grooves by the first mastering apparatus described above with reference to FIGS. 1 and 2 will be explained.

As in the case of recording a plurality of concentric grooves, the movable contact of the switch SW1 in the control circuit 20 is placed into contact with the stationary contact 1. The recording operation is carried out in accordance with the timing chart shown in FIG. 9. The galvanomirror 13 is so driven that the focused point of the laser beam on the substrate 15 is linearly displaced in the relative to the recording head 14 direction opposite to that in which the substrate 15 is linearly displaced in its radial direction.

When the distance between the adjacent grooves is selected as p, the spiral pitch is Po=np, where n is an integer.

The substrate 15 is rotated at a predetermined constant speed and one Z pulse signal as represented by curve (a) is generated every time the substrate 15 makes one rotation.

The substrate 15 is linearly displaced at a predetermined constant speed by the displacement mechanism and its displacement speed is so determined that the substrate 15 is displaced by one pitch Po for every 2n rotations of the substrate 15.

Figure 13:
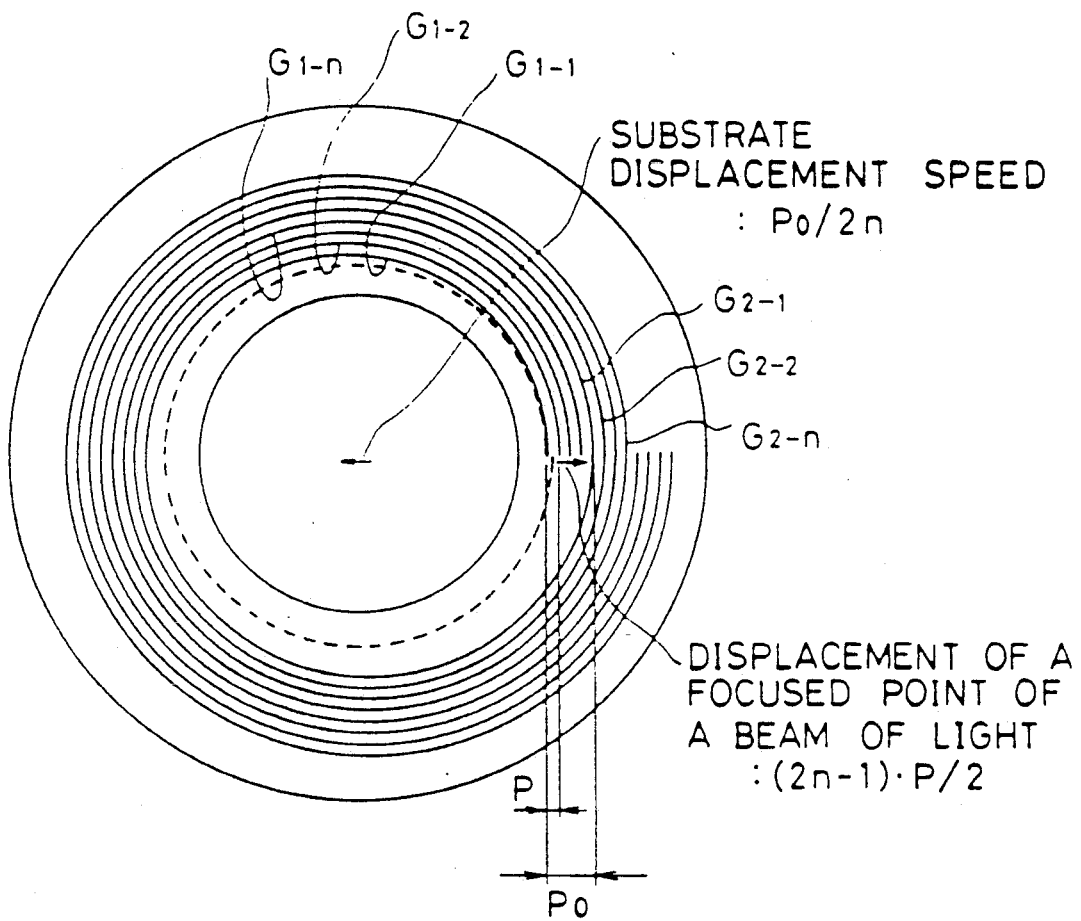
FIG. 13 is a top view illustrating a method for recording a plurality of juxtaposed spiral grooves.
Figure 14:
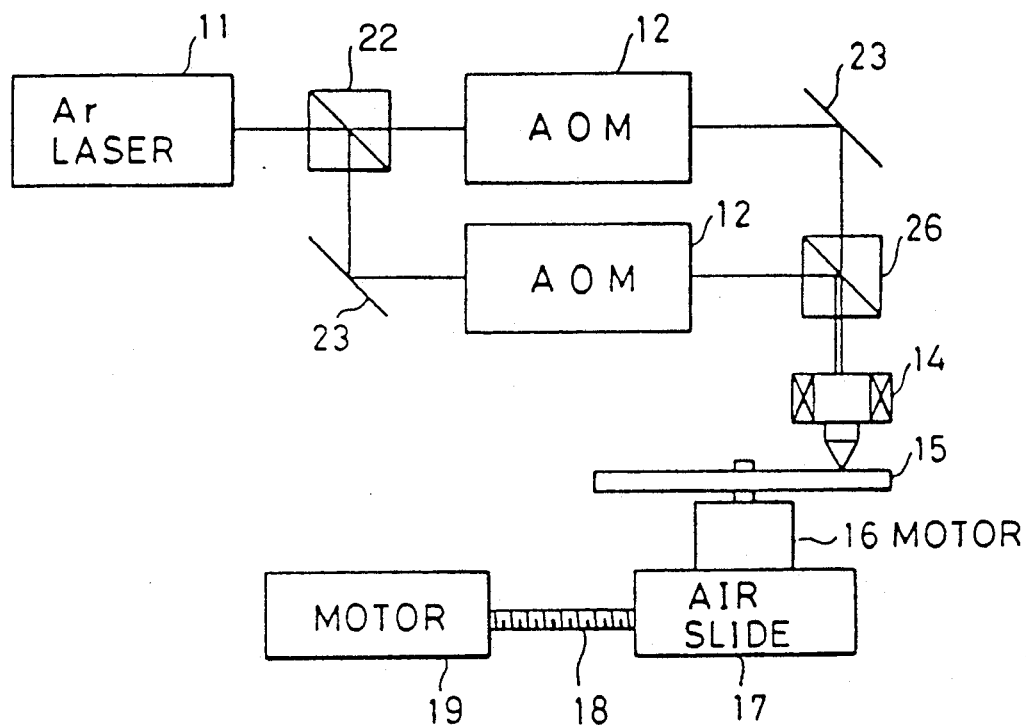
FIG. 14 is a schematic view of a conventional mastering apparatus.
Figure 15:
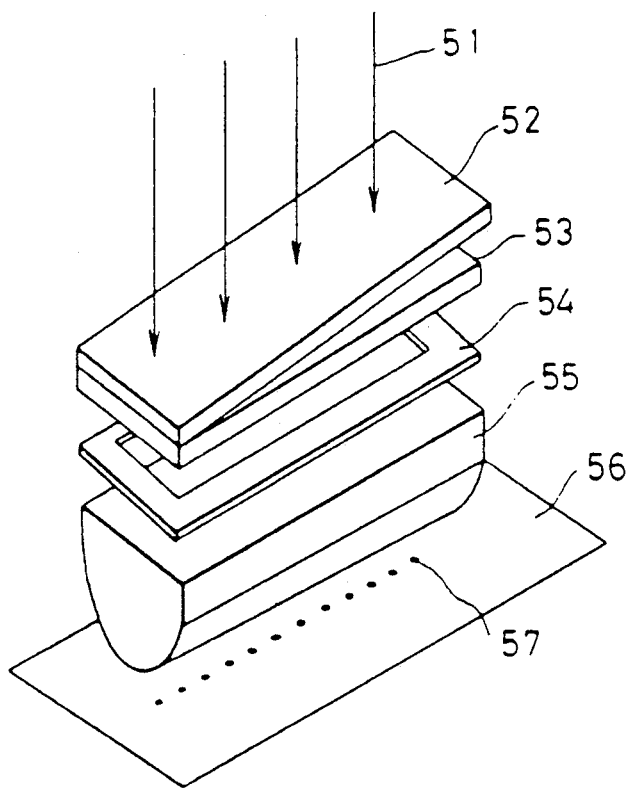
FIGS. 15 and 16 illustrate a fundamental arrangement for simultaneously recording a plurality of grooves by a conventional method and a view used for explanation of the underlying principle thereof.
Figure 16:
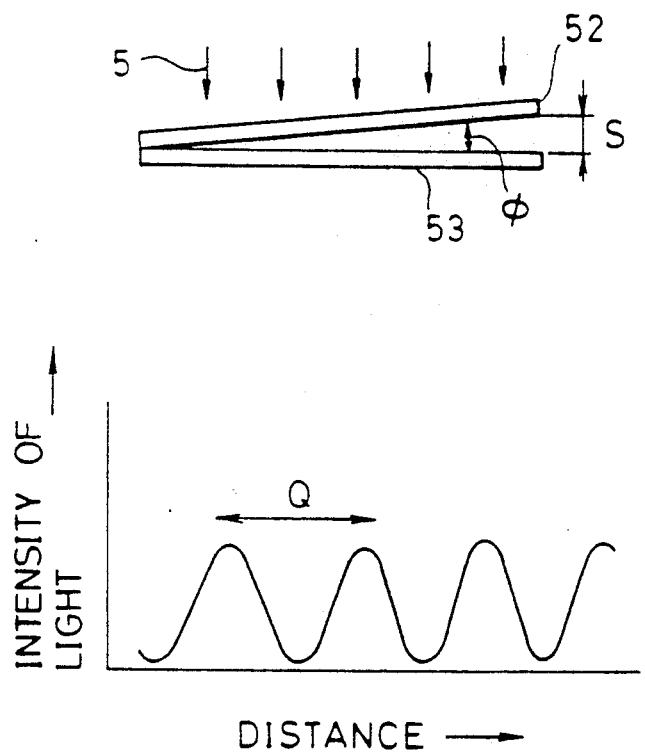

As shown in FIG. 13, simultaneously with the generation of the Z signal at the start of the recording operation, the AO modulator 12 is turned on to expose a first groove $G_{1-1}$. Concurrently, the z signal is applied to the galvanomirror 13 so that the beam of light focused on the substrate 15 draws a locus of one wind or turn of the spiral groove having the predetermined pitch Po by the displacement of the optical axis linearly in the direction opposite to the direction in which the substrate 15 is linearly displaced. In response to the generation of the second Z signal, the AO modulator 122 is turned off so that the exposure is interrupted while the signal for driving the galvanomirror 13 is turned off so that the optical axis is returned to its initial angle or position; that is, the optical axis is returned by a distance equal to $(2n-1)P/2$.

Next, while the rotation and the linear displacement of the substrate 15 are continued, the exposure operation is interrupted for one rotation during which the substrate 15 is advanced to a position spaced apart from the recording start position by an amount $p = Po/n$.

In response to the generation of the third Z signal, the driving signals are applied to the AO modulator 12 and the galvanomirror 13, respectively, so that the exposure of the second groove $G_{1-2}$ is started. The galvanomirror 13 is so driven that, as in the case of the exposure of the first groove $G_{1-1}$, the focused point of the beam of light draws a locus of one wind or turn at the predetermined pitch Po. In other words, the optical axis is displaced in such a way that the groove $G_{1-2}$ which is spaced apart by the distance P from the first groove $G_{1-1}$ is exposed.

In response to the generation of the fourth Z signal, the AO modulator 12 is turned off to interrupt the exposure and the driving signal applied to the galvanomirror 13 is also turned off so that the optical axis is returned to its initial position. Thus the exposure of the second groove $G_{1-2}$ is accomplished.

By repeating the above-described exposure steps, one wind or turn of the number of n juxtaposed spiral grooves $_{1-1}$-$G_{1-n}$ are exposed after $2_n$ rotations of the substrate. In this case, the substrate 15 is displaced to a position spaced apart from the starting point of the recording by the spiral pitch Po=np, in other words, to a position at which the recording of the first groove $G_{1-1}$ ends.

Next, in response to the generation of the $(2n+1)$-th Z signal, the signals for driving the AO modulator 12 and the galvanomirror 13 are turned on so that the exposure of the groove $G_{2-1}$ which is continuous with the first groove $G_{1-1}$ is exposed in a manner substantially similar to that described above for exposing the first groove $G_{1-1}$.

The steps for recording one wind or turn of the number of n juxtaposed grooves $G_{1-1}$ to $G_{1-n}$ for every 2n rotations of the substrate 15 are repeated, whereby the exposure operation for the number of n continuous spiral grooves is accomplished.

Next, EXAMPLE 7 will be described in detail hereinafter. A photoresist of 100 nm in thickness was coated over the surface of a glass substrate 15 by a spin coating process and then the substrate 15 was mounted on the first mastering apparatus to record juxtaposed spiral grooves. The number of grooves n is eight and the distance P between the adjacent grooves was determined at 1.6 μm. The rotation speed and the displacement speed of the substrate were 1800 rpm and 24 μm/sec and the pitch Po was 12.8 μm. The recorded substrate was developed to obtain an optical disc master.

Next, following the procedure of EXAMPLE 1, an optical disc substrate was made from the optical disc master thus obtained.

The distance between the adjacent grooves of the optical disc substrate thus obtained was measured by an optical microscope for 100 continuous grooves (which refers to the number of adjacent distances in an observation field) in each of 12 direction equi-angularly spaced apart from each other by 30° in the radial direction of the substrate 15. In each direction, the average distance between the adjacent grooves was 1.6 μm with variations of less than ±0.03 μm.

No discontinuity at the interconnecting points (of, e.g., the spiral grooves $G_{1-1}$ and $G_{2-1}$, which together form a continuous spiral) was observed. The optical disc substrate was mounted on a write/read apparatus with a semiconductor laser to test th tracking capability and it was found out that the tracking operation was carried out in a stable manner and it was confirmed from this operation that the grooves were in the form of a spiral and had no discontinuity at the interconnecting points.

EXAMPLE 8

A method for fabricating a master with 8 juxtaposed pit arrays by the second mastering apparatus as shown in FIGS. 3 and 4 will be described. EXAMPLE 8 is substantially similar to EXAMPLE 7 except that the AO deflector is used to displace the optical axis. The movable contact of the selection switch SW2 in the control circuit 20' is placed into with the stationary contact 3 while the switch SW3 is opened.

A photoresist of 120 nm in thickness was coated over the surface of a glass substrate 15 by a spin coating process and then the substrate 15 was mounted on the second mastering apparatus to record pit arrays. The recording signal was a digital signal and was used to record eight pit arrays. The remaining recording conditions were similar to those of the above-described EXAMPLE 7. The exposed substrate was developed to obtain an optical disc master. After the development, the width and the depth of pits were 0.6 μm and 0.09 μm, respectively.

Next, following the procedure of EXAMPLE 1, an optical disc substrate was prepared.

The distance between the adjacent pit arrays was measured and the tracking capability test was conducted in a manner substantially similar to that described above. The results were that the average distance between the adjacent pit arrays was 1.6 μm with variations of less than ±0.03 μm and that no discontinuity at the interconnecting points was observed The tracking of the pit arrays was carried out in a stable manner and it was confirmed from the tracking operation that the pit arrays are in the form of a spiral and had no discontinuity at the interconnecting points. In addition, each pit array was tracked by a tracking jump method to read out the signals and high-quality read-out signals were obtained from all of the eight pit arrays.

EXAMPLE 9

A method for fabricating a master with a pattern of alternate spiral groove and pit arrays by the third mastering apparatus as shown in FIGS. 6 and 7 will be described.

In this EXAMPLE, the movable arm of the selection switch SW1 in the control circuit 20 is placed into contact with the stationary contact 2.

A photoresist of 120 nm in thickness was coated over the surface of a glass substrate 15 by a spin coating process and then the substrate 15 was mounted on the third mastering apparatus to record grooves and pit arrays. More particularly, the total number of 16 lines consisting of eight grooves and eight pit arrays was recorded and each distance p between the groove and the pit array was 1.6 μm. The rotational speed and the displacement speed in the radial direction of the substrate 15 were 900 rpm and 12 μm/sec, respectively. The pitch Po was 25.6 μm. The exposed substrate was developed to obtain a master.

Following the procedure of EXAMPLE 1, an optical disc substrate was made.

Next, the distance between the groove and the pit array of the optical disc substrate thus obtained was measured and the tracking capability was tested. The results were that the average distance between the groove and the pit array was 1.6 μm with variations of less than ±0.03 μm and that no discontinuity at the interconnecting points was observed. The tracking of 16 lines consisting of eight grooves and eight pit arrays was carried out in a stable manner. Then it was confirmed from the above-mentioned test that no discontinuity exists at the interconnecting points and the high-quality read-out signals were obtained from the eight pit arrays.

EXAMPLE 10

Next, a method for recording wobble marks along juxtaposed spirals by the second mastering apparatus as shown in FIG. 3 or FIG. 5 will be described hereinafter.

In this case, the movable contact of the selection switch SW2 in the control circuit 20' is made into contact with the stationary contact 3 while the switch SW3 is closed.

The substrate 15 is rotated at a predetermined constant rotational speed and the displacement speed in the radial direction of the substrate 15 is such that the substrate 15 is advanced by the distance p for every two rotations of the substrate 15. The AO deflector 23 displaces the optical axis of the beam of light to draw a spiral with a predetermined pitch Po per rotation of the substrate.

Next, as in the case of the formation of the concentric prepit arrays with wobble marks described above, the AO deflector 23 is driven in response to the AO-deflector driving signal which is the sum of the signal from the sampled servo formatter 20H and the signal from the D/A converter 20E.

EXAMPLE 10 will be more particularly described hereinafter.

A photoresist is coated to 160 μm in thickness over the surface of a glass substrate 15 by a spin coating process and the substrate 15 was mounted in the mastering apparatus as shown in FIG. 3 to record eight juxtaposed spiral pit arrays including wobble marks. The rotational speed and the displacement speed of the substrate were 1800 rpm and 24 μm, respectively. That is, the distance between the adjacent pit arrays was determined at 1.6 μm. The recorded substrate 15 was developed to obtain a master.

Following the procedure of EXAMPLE 1, an optical disc substrate 15 was made.

The distance between one hundred continuous pit arrays in each of twelve radial directions which are equi-angularly spaced apart from each other by 30° was measured by an optical microscope. The measurement result showed that the average distance was 1.6 μm with variations of less than ±0.03 μm. Wobble marks were recorded at positions which were deviated by 0.4 μm from the center of each pit array. Thereafter the optical disc substrate 15 was mounted on a write/read apparatus with a semiconductor laser to test the tracking capability. The tracking by a sampled servo was carried out in a stable manner and therefore it is confirmed from this test that the pit arrays had no discontinuity at the interconnecting points and were in the form of spiral. High-quality signals were read out from each of the eight pit arrays.

In order to produce an optical disc, an Ni film 40 nm in thickness is coated over the glass substrate 15 obtained in the manner described above by a vacuum evaporation process.

Next the surface of the glass substrate 15 which is made conductive in the manner described above is plated with Ni 300 μm in thickness so that an Ni master is made.

Thereafter, the Ni master is stripped from the glass substrate 15 and after the removal of the residual photoresist, the Ni master is plated with Ni, whereby an Ni mother is obtained. Next the Ni mother is further plated with Ni, whereby an Ni stamper is obtained. A plurality of Ni mothers and Ni stampers can be produced as needs demand.

Thereafter, a useless peripheral portion of the Ni stamper is cut off and the rear surface of the stamper is polished. Then the Ni stamper is mounted on an injection-molding machine to produce optical disc substrates which are made of a resin such as polycarbonate or the like. Thus the optical disc substrate having a track pattern transferred from the master is produced. Next, a $CS_2Te$ film 20 nm in thickness is deposited by the plasma polymerization process, whereby an optical disc is obtained.

The invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. In a method for fabricating an optical disc master from a substrate coated with photosensitive material, comprising the steps of:
   (a) providing a light source, means for modulating said light source for producing a modulated light beam along an optical axis, and means for displacing said optical axis;
   (b) providing a recording head which directs said modulated light beam onto the substrate, and means for effecting relative linear displacement of said substrate and recording head;
   (c) rotating said substrate at a predetermined constant rotational velocity while projecting said modulated light beam onto a surface of said substrate to expose said photosensitive material through said recording head;
   (d) continuously displacing at least one of said substrate and said recording head radially relative to each other while said substrate is rotating;
   (e) forming a plurality of separate turns on said substrate, said plurality of turns being formed by:
      (i) modulating said light beam to expose said substrate during one revolution of said substrate to record an individual turn of a track on said surface of said substrate while simultaneously displacing said optical axis of said modulated light beam away from an initial position to direct said modulated light beam in a direction which is generally parallel to the direction of relative displacement between said substrate and said recording head;
      (ii) returning said optical axis of said modulated beam of light to said initial position while simultaneously causing the continuous displacement of step (d) and causing said means for modulating to interrupt the projection of said modulated beam of light on said substrate which is maintained to rotate at said predetermined constant rotation speed; and
      (iii) repeating steps (e) (i) and (e) (ii) a plurality of times, with the light beam beginning at a new circumferential position of the substrate for each succeeding, individual turn of a track recorded on the substrate.

2. A method for fabricating an optical disc master as claimed in claim 1, wherein in step (e) (i) said optical axis of said modulated beam of light is displaced in a direction relative to the substrate to maintain a distance between the center of said substrate and a focused point of said modulated beam of light on the surface of said substrate at a predetermined constant radial distance, so that said succeeding turns are concentric.

3. A method for fabricating an optical disc master as claimed in claim 1, wherein in step (e) (i), said optical axis of said modulated beam of light is displaced in a direction in which the relative displacement speed between said substrate and said recording head is increased, the displacing of said optical axis occurring at a predetermined constant relative speed such that a focused point of said modulated beam of light is displaced by a predetermined pitch (Po) during 2n rotations of said substrate, where n is a positive integer, such that a first spiral turn having said predetermined pitch (Po) is exposed during a first rotation of said substrate;
   in step (e) (ii), during a second rotation of said substrate at said predetermined constant speed, interrupting the projection of said modulated beam of light and returning said optical axis of said beam of light to said initial position and interrupting said modulated beam of light wherein said recording head is radially advanced by a distance equal to Po/n from a radial position at which said first spiral turn is started; then, during a third rotation of said substrate, exposing said substrate with said modulated beam of light to form a second spiral turn which is radially spaced apart from said first spiral turn by a predetermined pitch Po/n; during a fourth rotation of said substrate, interrupting the projection of said beam of light while said optical axis of said beam of light is returned to said initial position which is advanced by a radial distance equal to 2P/n from said position at which said first spiral turn is started; and during a fifth and succeeding rotations of said substrate, repeating the foregoing steps, thereby exposing a first turn of each succeeding plurality of spiral tracks which are n in number during every 2n rotations of said substrate, after returning said optical axis to said initial position at which the recording of said first turn of an n-th spiral turn is interrupted,
   repeating the foregoing steps for exposure of a plurality of spiral turns which are respectively continuous with said first turn of said tracks after a 2n+1)-th rotation of the substrate to record a track pattern having a plurality of juxtaposed continuous spiral tracks formed by respective connected turns.

4. A method for fabricating an optical disc master as claimed in claim 3, wherein said number of juxtaposed spiral tracks is in a range between 2 and 16.

5. A method for fabricating an optical disc master as claimed in claim 1, wherein step (e) includes providing a galvanomirror for displacing said optical axis of said beam of light.

6. A method for fabricating an optical disc master as claimed in claim 1, wherein step (e) includes providing an AO deflector for displacing said optical axis of said beam of light.

7. A method for fabricating an optical disc master as claimed in claim 1, wherein step (e) includes providing a radial displacement mechanism in said recording head for displacing said optical axis of said beam of light.

8. An optical disc produced by using an optical disc master fabricated in accordance with the method defined in claim 1.

9. An optical disc produced by using an optical disc master fabricated in accordance with the method defined in claim 2.

10. An optical disc produced by using an optical disc master fabricated by the method defined in claim 3.

11. An apparatus for fabricating an optical disc master from a substrate coated with photosensitive material, comprising:

driving means for rotating said substrate coated with a photosensitive material at a predetermined constant speed;

a laser light source;

modulation means for modulating a laser beam emitted from said laser light source;

a recording head;

means for causing continuous relative movement between said substrate and said recording head in the radial direction of said substrate during a revolution of said substrate; and optical axis deflecting means for variably deflecting an optical axis of said beam of light focused on said substrate in the direction of said relative movement between said substrate and said recording head during the revolution of said substrate.

12. An apparatus for fabricating an optical disc master as claimed in claim 11, wherein said optical axis deflecting means is a galvanomirror.

13. An apparatus for fabricating an optical disc master as claimed in claim 11, wherein said optical axis deflecting means is an AO deflector.

14. An apparatus for fabricating an optical disc master as claimed in claim 11, wherein said optical axis deflecting means is a radial displacement mechanism incorporated in said recording head.

* * * * *